(12) United States Patent
Jacobs et al.

(10) Patent No.: US 8,083,240 B2
(45) Date of Patent: Dec. 27, 2011

(54) FOLDABLE STROLLER

(75) Inventors: Imre Peter Jacobs, Utrecht (NL); Martijn Hans Van Gelderen, Amsterdam (NL); Therese Johansson, Amsterdam (NL)

(73) Assignee: Nuna International B.V., Amsterdam (NL)

( * ) Notice: Subject to any disclaimer, the term of this patent is extended or adjusted under 35 U.S.C. 154(b) by 0 days.

(21) Appl. No.: 12/663,282

(22) PCT Filed: Jun. 6, 2008

(86) PCT No.: PCT/EP2008/057104
§ 371 (c)(1),
(2), (4) Date: Apr. 21, 2010

(87) PCT Pub. No.: WO2008/148880
PCT Pub. Date: Dec. 11, 2008

(65) Prior Publication Data
US 2010/0201104 A1    Aug. 12, 2010

Related U.S. Application Data

(60) Provisional application No. 60/933,704, filed on Jun. 8, 2007.

(51) Int. Cl.
*B62B 7/10* (2006.01)

(52) U.S. Cl. ............. 280/47.38; 280/642; 280/650; 280/655

(58) Field of Classification Search ............ 280/33.993, 280/47.38, 639, 642, 643, 644, 647, 648, 280/649, 650, 658; 297/195.13, 218.1, 218.2, 297/218.3, 219.12, 440.11
See application file for complete search history.

(56) References Cited

U.S. PATENT DOCUMENTS

| | | | |
|---|---|---|---|
| 2,556,121 A * | 6/1951 | Thomas | 280/304.1 |
| 2,781,225 A | 2/1957 | Heideman | |
| 2,823,043 A | 2/1958 | Shone | |
| 3,075,783 A | 1/1963 | Flam | |
| 3,084,949 A | 4/1963 | Forster et al. | |
| 3,443,823 A | 5/1969 | Perego | |
| 3,834,726 A * | 9/1974 | Hobza | 280/87.041 |
| 3,877,723 A * | 4/1975 | Fahey et al. | 280/204 |
| 4,119,331 A * | 10/1978 | Jackson | 280/639 |

(Continued)

FOREIGN PATENT DOCUMENTS
DE   42 29 857   3/1994
(Continued)

OTHER PUBLICATIONS
International Search Report of PCT Application; PCT/EP2008/057104; mailed May 27, 2009.

(Continued)

*Primary Examiner* — J. Allen Shriver, II
*Assistant Examiner* — James Triggs
(74) *Attorney, Agent, or Firm* — Steptoe & Johnson LLP

(57) ABSTRACT

A stroller (1), movable between an open position wherein the stroller can be locked and a folded position, comprising: front wheels (6) and rear wheels (5); a generally planar base frame (2) extending substantially between said front and rear wheels; two push bars (3) pivotally connected to the base frame by a front hinge (4) substantially located near the front wheels, which push bars extend substantially upwards and backwards in the open position; wherein the axis of the front hinge extends substantially in the plane of the base frame and substantially intersects the central axes of the push bars.

24 Claims, 8 Drawing Sheets

U.S. PATENT DOCUMENTS

Figure 4:
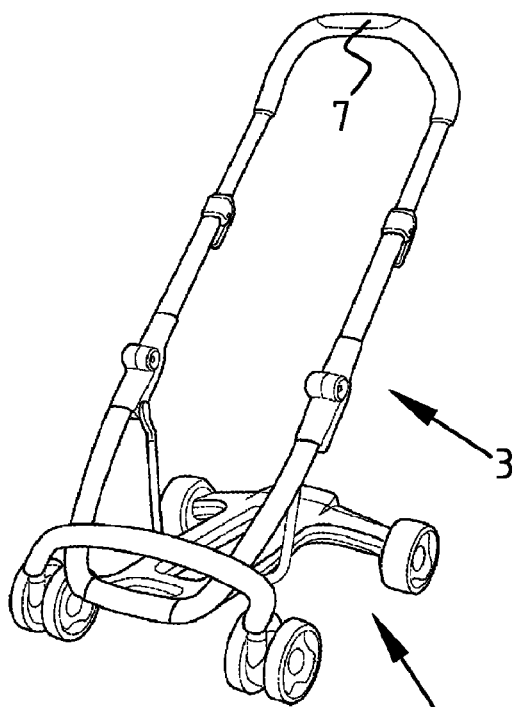

| | | | |
|---|---|---|---|
| 4,305,601 A * | 12/1981 | Berge | 280/304.1 |
| 4,484,755 A * | 11/1984 | Houston | 280/33.992 |
| 4,706,975 A * | 11/1987 | Arena et al. | 280/33.992 |
| 5,658,002 A * | 8/1997 | Szot | 280/304.1 |
| 5,794,957 A * | 8/1998 | Mendon | 280/204 |
| 5,882,022 A * | 3/1999 | Convertini et al. | 280/47.38 |
| 5,934,757 A | 8/1999 | Smith et al. | |
| 5,974,636 A | 11/1999 | Brown et al. | |
| D428,367 S * | 7/2000 | Lundh | D12/133 |
| 6,422,634 B2 * | 7/2002 | Lundh | 296/97.21 |
| 6,540,238 B2 * | 4/2003 | Yang | 280/32.7 |
| 6,557,871 B2 | 5/2003 | Hsia | |
| 6,886,851 B2 * | 5/2005 | Chen | 280/642 |
| 7,188,858 B2 | 3/2007 | Hartenstine et al. | |
| 7,234,722 B1 * | 6/2007 | Madigan et al. | 280/642 |
| 7,571,926 B2 * | 8/2009 | Huang | 280/647 |
| 7,832,755 B2 * | 11/2010 | Nolan et al. | 280/642 |
| 2001/0033069 A1 * | 10/2001 | Ivers | 280/648 |
| 2003/0011155 A1 * | 1/2003 | Hsia | 280/47.38 |
| 2003/0201626 A1 | 10/2003 | Hartenstine et al. | |
| 2006/0214395 A1 * | 9/2006 | Ageneau | 280/642 |

FOREIGN PATENT DOCUMENTS

| | | |
|---|---|---|
| DE | 195 29 577 | 2/1997 |
| DE | 299 14 253 | 10/1999 |
| DE | 200 16 773 | 1/2001 |
| EP | 0757641 | 8/1998 |
| FR | 1053593 | 2/1954 |
| FR | A2648102 | 12/1990 |
| WO | WO 95/29086 | 11/1995 |
| WO | WO 2006/029468 | 3/2006 |
| WO | WO 2007/025551 | 3/2007 |

OTHER PUBLICATIONS

International Preliminary Report on Patentability; mailed Dec. 11, 2009; PCT/EP2008/057104.

Written Opinion; mailed Dec. 8, 2009; PCT/EP2008/057104.

* cited by examiner

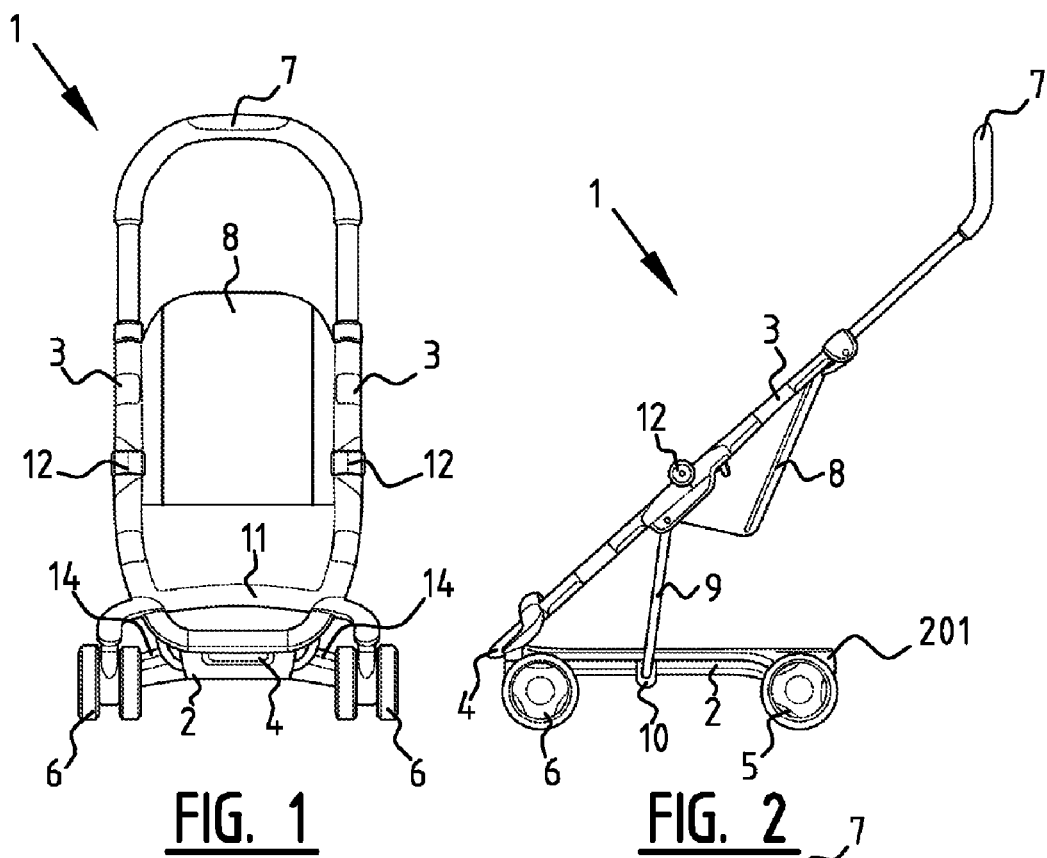
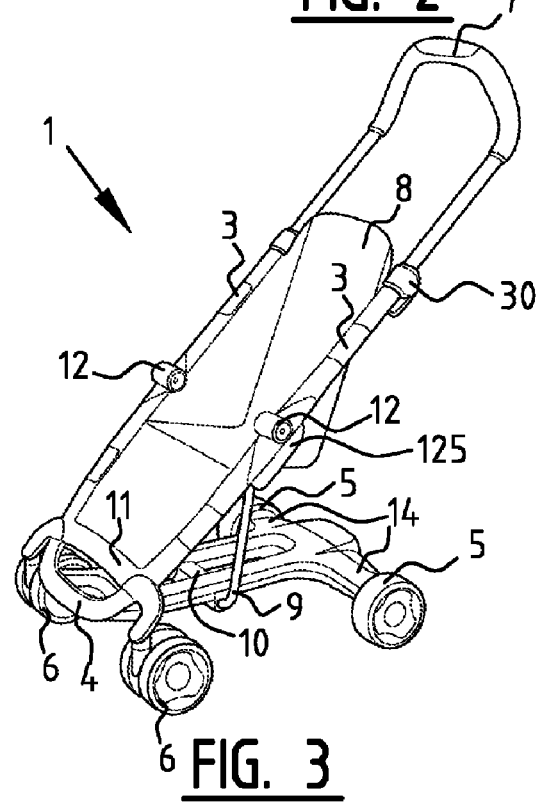
FIG. 1
FIG. 2
FIG. 3

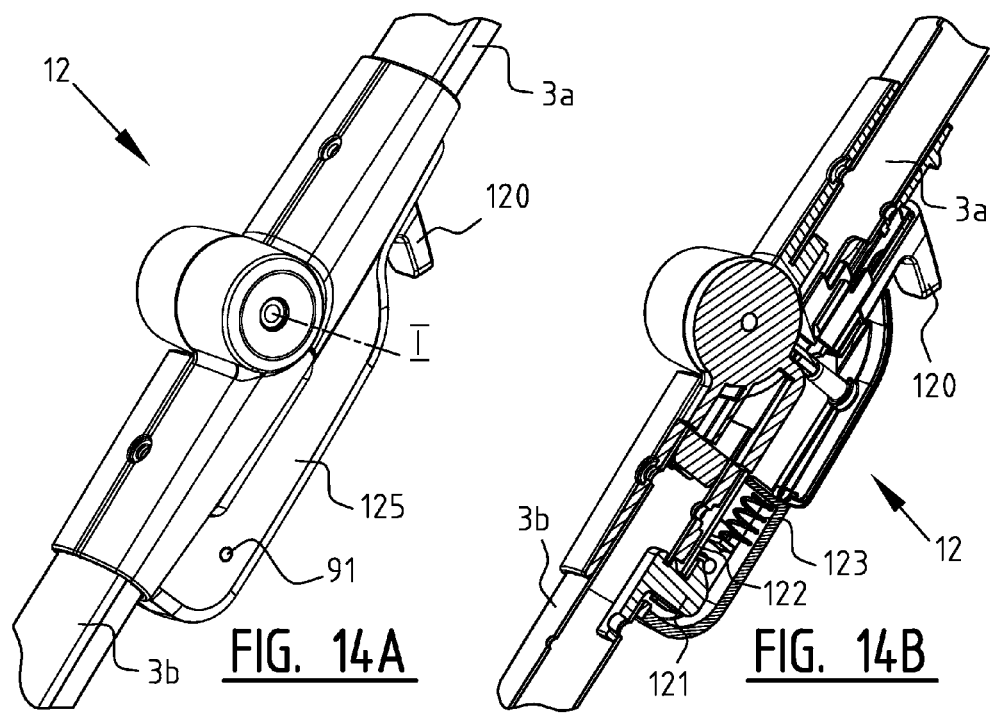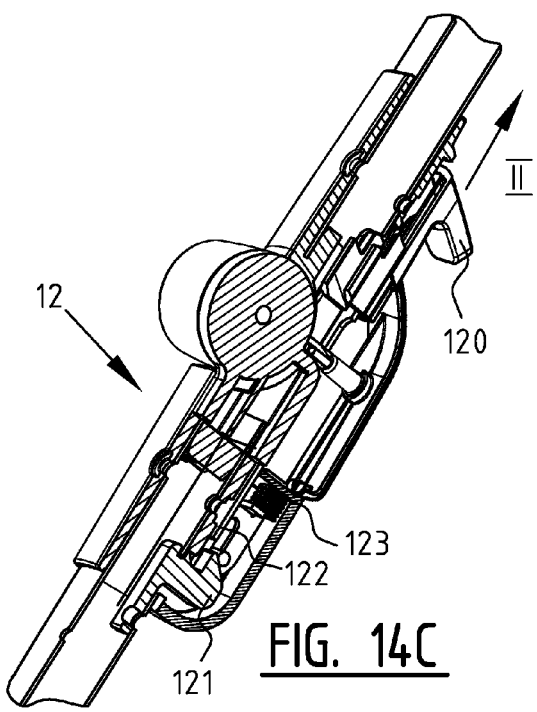

FOLDABLE STROLLER

CLAIM OF PRIORITY

This application claims priority under 35 USC 371 to International Application No. PCT/EP2008/057104, filed on Jun. 6, 2008, which claims priority to U.S. Provisional Application Ser. No. 60/933,704, filed Jun. 8, 2007, each of which is incorporated by reference in its entirety.

The invention relates to foldable strollers. The invention furthermore relates to a seat assembly for a stroller.

A foldable carriage comprises a base frame with front and back wheels and a seat assembly. The product is adapted to carry a child while another person is pushing or pulling the carriage. The total product is changeable in configuration, making it possible to switch between a folded or unfolded state. The folded state of the product allows easy carrying and storing of the product, due to the compactness of the package. The seat assembly can easily be removed and therefore replaced, allowing different configurations of the seat assembly.

Strollers, buggies or other baby carriers are used to carry and/or transport a child. Often, after the baby is taken out of the buggy, the product is folded or changed in configuration to be stacked or carried away.

Products currently on the market are available in many configurations, depending on the age, weight and size of the child being transported. Parents can choose a product that is not only the correct size, but suits their budget, taste and style as well.

Especially in the situation where the child is taken on a trip or walk, it is important that the buggy is easy to fold and carry or store after the child is taken out of the product. In this respect, a low weight and compact package of the folded product is important.

An inherent problem with the current designs is that the folding of the products requires many and sometimes difficult steps.

Another problem is that the product in the folded state is not compact and therefore not easy to store or carry.

Further, the product in the folded state often is not easy to carry, especially in the case where the product has to be taken along for a longer time.

It is a goal of the invention to make the buggy in such a way that the product is easy to use, easy to adjust to suit different usages and tastes and is safe for the child and parent.

Another objective is to simplify the shape, use and style of the product.

In order to accomplish the objectives, a stroller is provided, movable between an open position wherein the stroller can be locked and a folded position, comprising: front wheels and rear wheels; a generally planar base frame extending substantially between said front and rear wheels; two push bars pivotally connected to the base frame by a front hinge substantially located near the front wheels, which push bars extend substantially upwards and backwards in the open position; wherein the axis of the front hinge extends substantially in the plane of the base frame and substantially intersects the central axes of the push bars.

The intersecting axes of the push bars and the hinge substantially extending in the plane of the base frame allows a compact configuration in the folded position, wherein said components substantially extend in said same plane. It should be noted that the "central axis" of a bar is defined as the (virtual) line running parallel to the bar, through the centre thereof.

Preferably, the distance between the axis of the front hinge and the upper plane of the base frame is less than half the thickness of the base frame, and more preferably the distance between de axis of the front hinge and the central plane of the base frame is less than 3 cm. Such a configuration allows a compact stroller in the folded position, wherein the push bars are preferably in juxtaposition with the base frame in the folded position, substantially extending in the same plane. Noted should be that the "central plane" is the (virtual) plane running through the centre of the generally planar base frame.

Preferably, the outer ends of the push bars are connected to a push member, such that the front hinge, the push bars and the push member form a closed circumference. Preferably, the push member extends substantially horizontally. This will increase the rigidity of the stroller.

To be able to fold the stroller to the folded position, the push bars comprise an upper push bar member and a lower push bar member pivotally connected to the upper push bar member, which allows the upper push bar member to be pivoted with respect to the lower push bar member and to be folded towards the front hinge. The folding of the push bar allows an even more compact configuration in the folded position.

The front hinge is preferably arranged to form a handle, or alternatively a handle is arranged near the hinge substantially in the plane of the base frame to carry the stroller when the stroller is in the folded position. Arranging the hinge as handle according to the invention reduces the number of parts for fabricating the stroller, resulting in a cheaper and/or more reliable stroller.

Preferably, the central part of the push member extends at a distance from and above the plane through both push bars in the open position. And preferably the central part of the push member extends under the lower plane of the handle and the base frame when the stroller is in the folded position. Preferably, hinge extends between the legs of the U-shaped center part of the push member, preventing unintentional opening of the stroller by the arm of the person carrying the stroller.

Preferably, the push bars have a cross section having dimensions that are larger in lateral direction than in the direction perpendicular to the plane through both push bars and more preferably, the push bars comprise substantially half circular shaped cross-sectional areas, whereby the upper push bar member and the lower push bar member form a substantially circular cross-sectional area in the folded position, hereby allowing a compact configuration in the folded position.

Preferably, the stroller comprises a locking mechanism between the upper push bar member and the lower push bar member and locks the stroller in the open position, a support member with two ends pivotally connected to the locking mechanism and the base frame respectively.

The stroller further preferably comprises a support member extending substantially upwardly in the open position between an intermediate location of the base frame and an intermediate location of the push bars and pivotally connected therewith at both ends, for example by hinging means. The support member provides rigidity and stability to the stroller in the open position. Preferably the support member is substantially U-shaped and includes a base and two legs connected to two end of the base, wherein the base of the U-shape is pivotally connected to the base frame and the extremities of the respective legs of the U-shape are pivotally connected to the push bars and more preferably, the base of the U-shape of the support member extends beneath the base frame. Even more preferably, the extremities of the legs of the U-shaped support member are pivotally connected to extensions of the upper parts of the hingable push bars that extend beyond the hinges of the push bars. By arranging the support member as a U-shaped member and arranging the U-shaped member under the base frame, easy and reliable support means for the stroller are provided.

For comfort, the connection between the base frame and the support member preferably comprises damping means and more preferably the damping means comprises at least one rubber member arranged between the support member and the base frame. Even more preferably, the rubber member is arranged between the support member and the lower half of the base frame, for instance by providing a rubber tube coaxial to the lower part of the support member i.e. the base of the U-shaped support member. The resilient rubber tube provided on the support member then provides the damping to the push bar members.

In another embodiment, the damping means comprise a spring member, wherein the spring member is preferably arranged between the support member and the upper half of the base frame for increasing the working distance of the spring member.

Preferably, the base frame comprises rear wheel support members extending laterally for connecting the rear wheels to the base frame, wherein adjacent to the base frame the top side of the rear wheel support members are lower than the top side of the base frame for accommodating the push bars in juxtaposition to the base frame in the folded position, resulting in a compact configuration in the folded position. More preferably, the wheel supports have the shape of wings and together with the rear portion of the base frame form a bent board. This board can for instance be used the placement of goods.

The stroller according to the invention further preferably comprises a detachable rolling extension board for supporting children, wherein the rear portion of the base frame and/or the front portion of the extension board comprises means for attaching a rolling extension board for supporting children. More preferably, the front edge of the detachable rolling extension board for supporting children matches the rear edge of the base frame.

Preferably, the front wheels at both sides are interconnected by a front wheel support member, whereby the front wheel support member is connected to the push bars at both sides at locations above the hinge. This allows the front wheels to fold to the folded position when the push bars are folded from the open position to the folded position. And more preferably, the central portion of the front wheel support member extends substantially above the plane of the push bars for accommodating the base frame between the push bars in the folded position. The central portion can therefore be used as footrest for the person being transported.

According to another aspect of the invention, there is provided a stroller comprising a frame having two push bars extending substantially upwards and backwards having a seat attached thereto, said seat substantially consisting of a flexible sheet material shaped into a bucket having a back rest, characterized in that the back rest of the sheet is provided with at least one V-shaped extension portion, the open side of said V-shape extending at the top side of the back rest, and connecting means for joining the legs of the V-shaped portion for reducing the inclination of the back rest. Preferably, two of said V-shaped extension portions are provided, one at each side of the back rest. By changing the inclination of the backrest using the connecting means, the seat can for instance be changed from a sleeping position to a wake position without the need to mechanically pivot the seat, reducing the number of parts and increasing the reliability of the stroller. Preferably, the connecting means comprise a zipper, allowing readily adjustment of the back seat. And more preferably, the seat is removable attached to the frame.

The stroller according the invention can use few frame parts, few connecting parts and clear shapes. The main shape is determined by the frame parts and seat assembly.

Figures 8A, 8B, 8C:
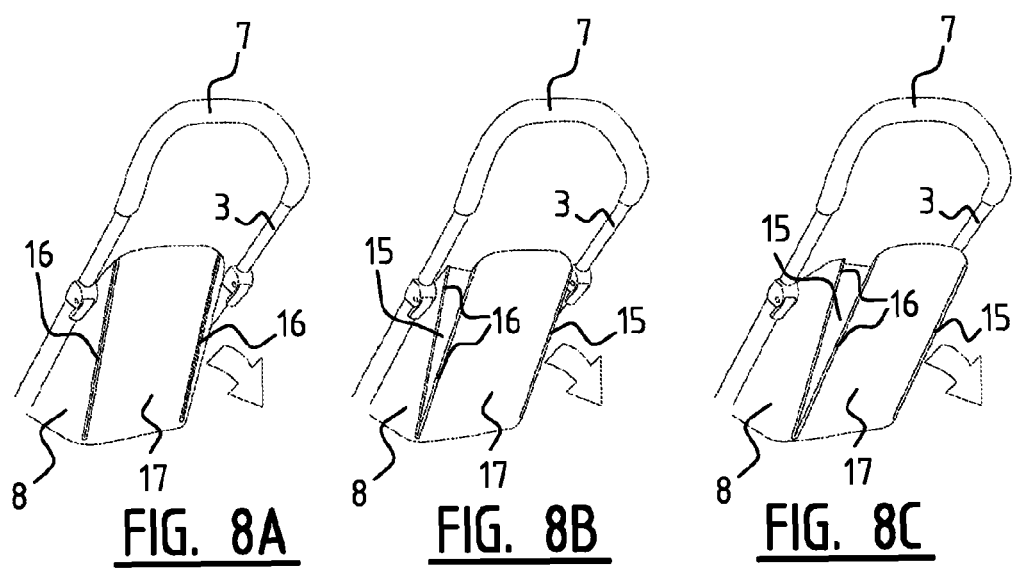
Figure 9:
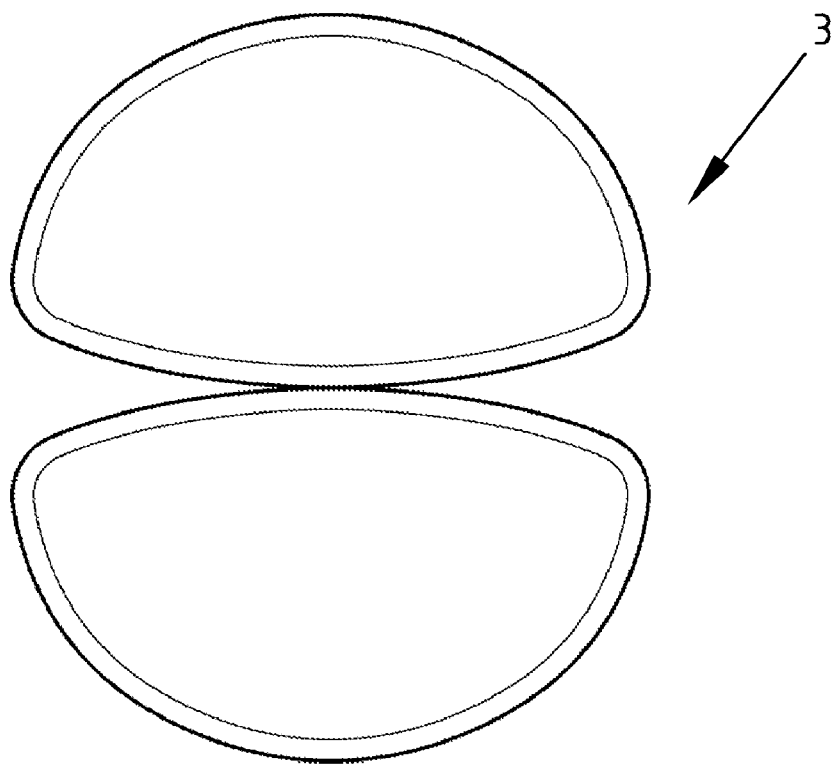
Figure 10:
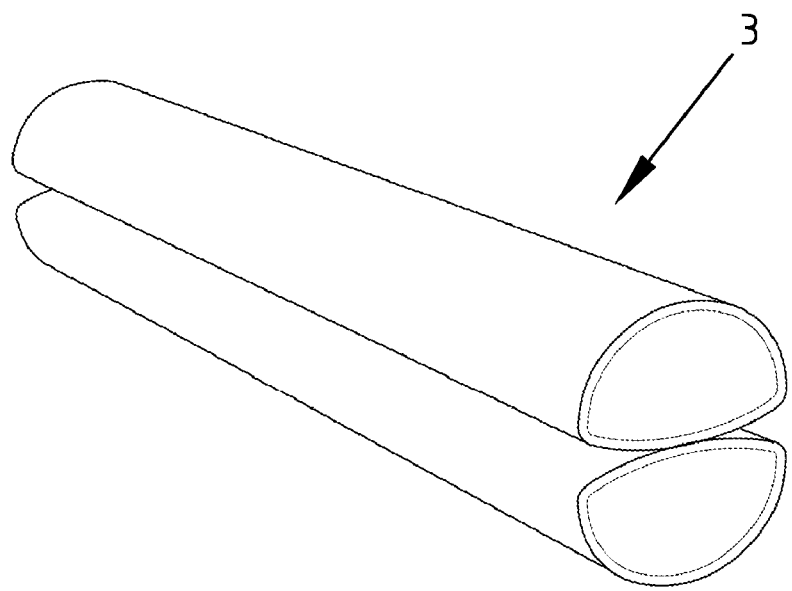
Figure 11A:
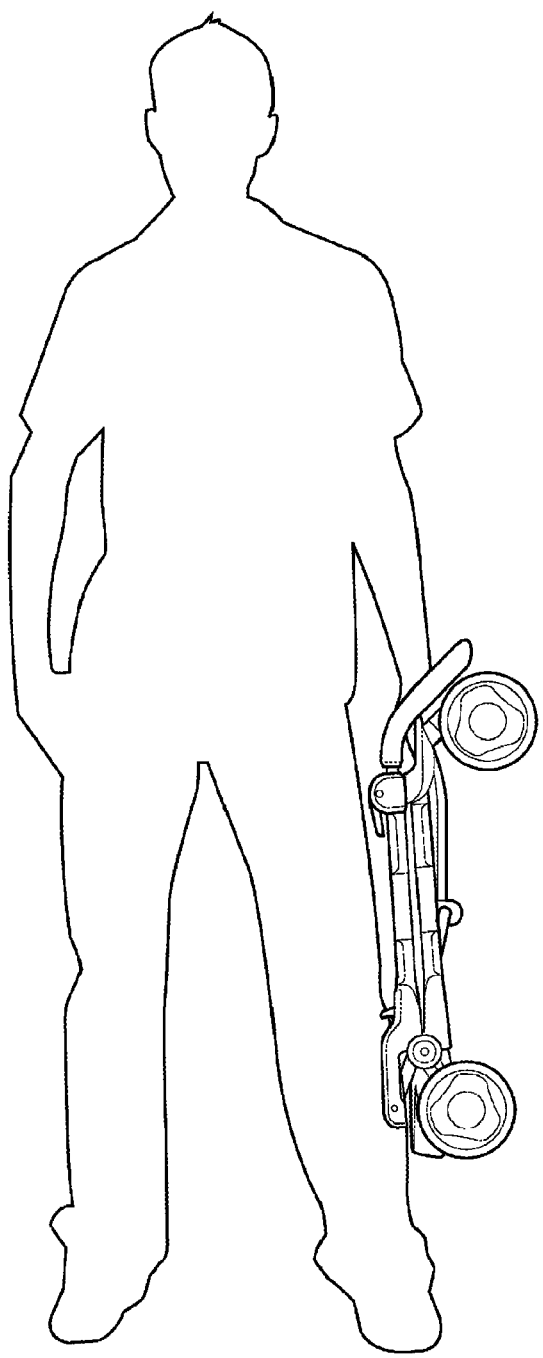
Figure 11B:
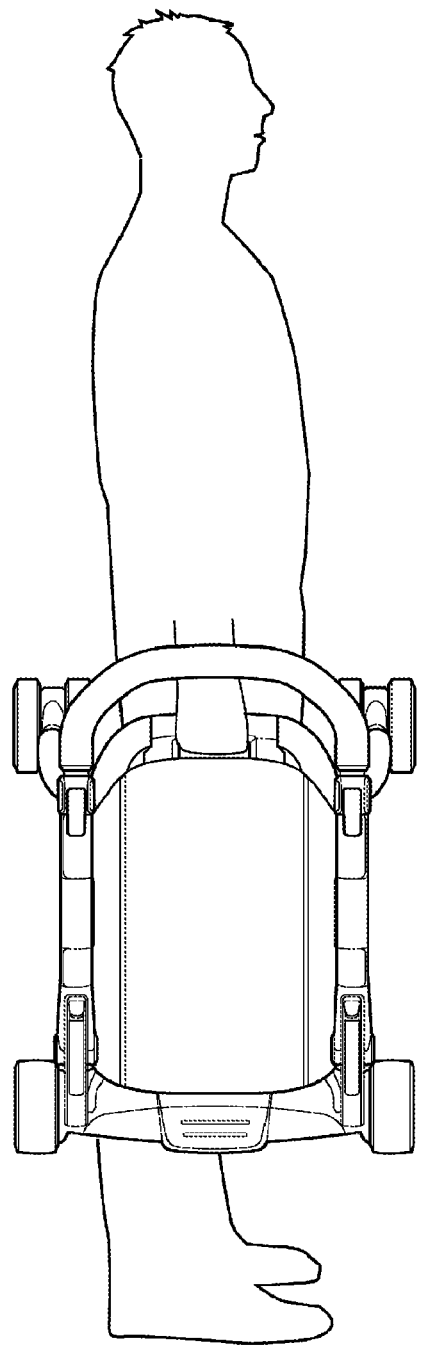
Figure 12:
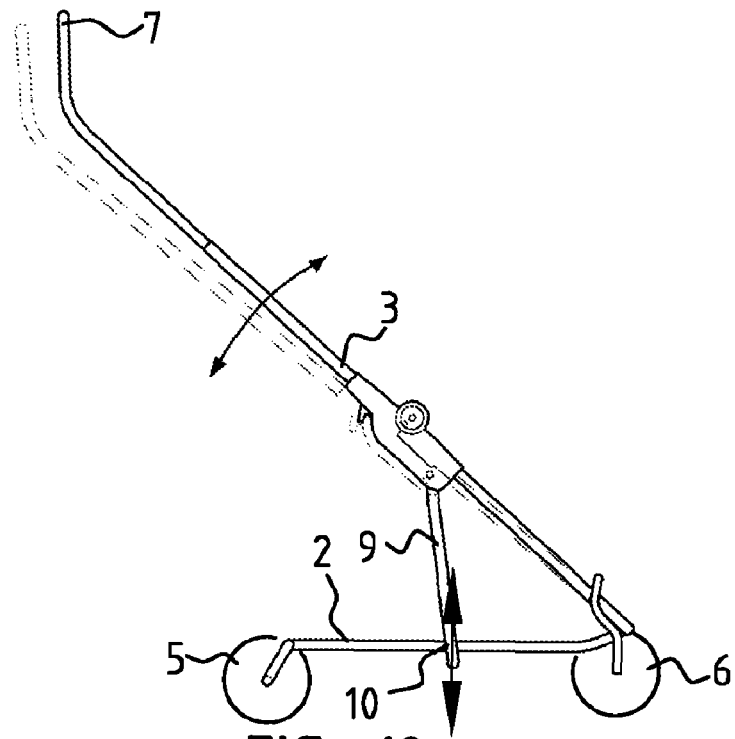
Figure 13:
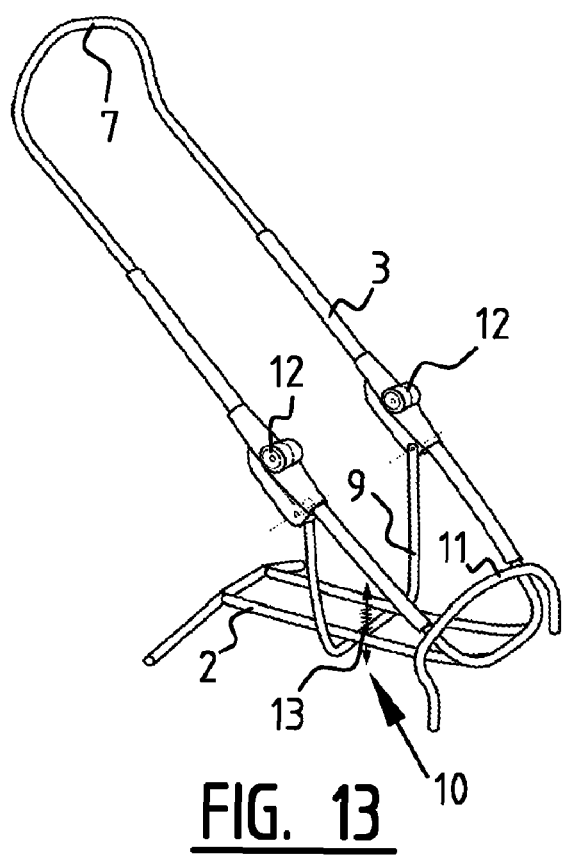
Figure 15:
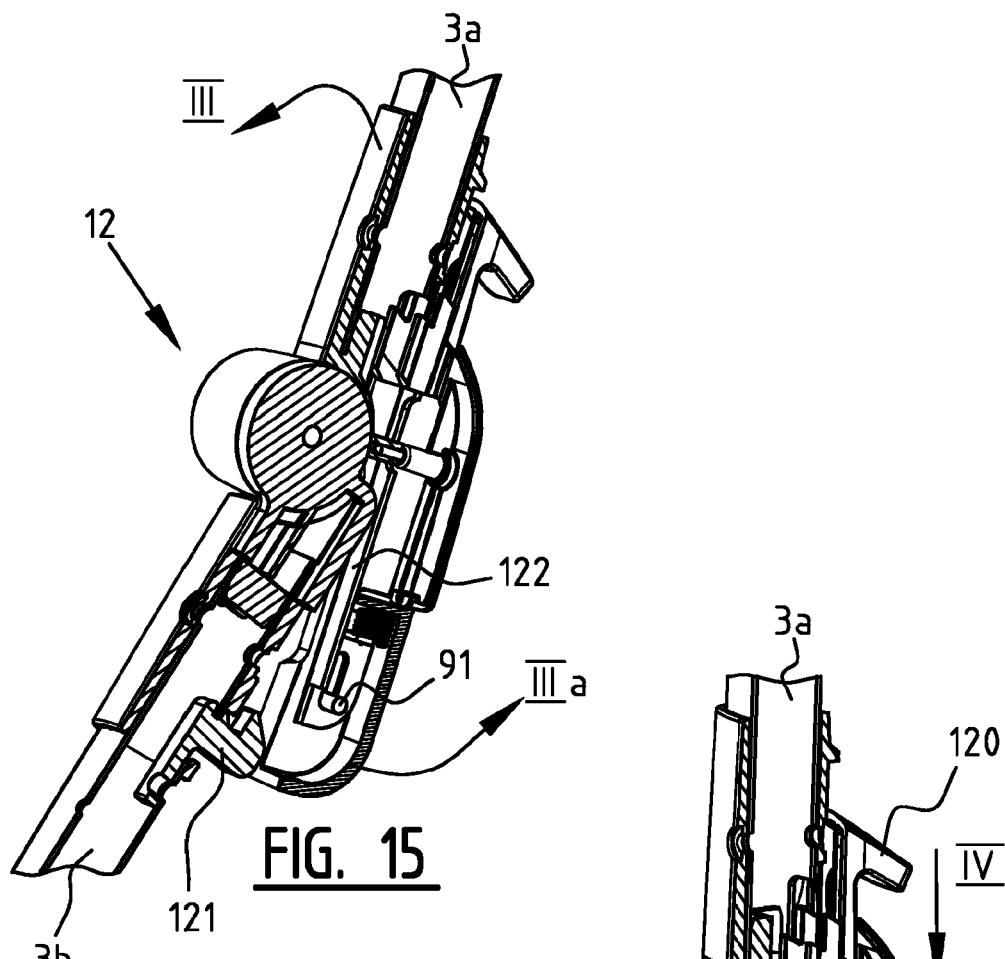
Figure 16:
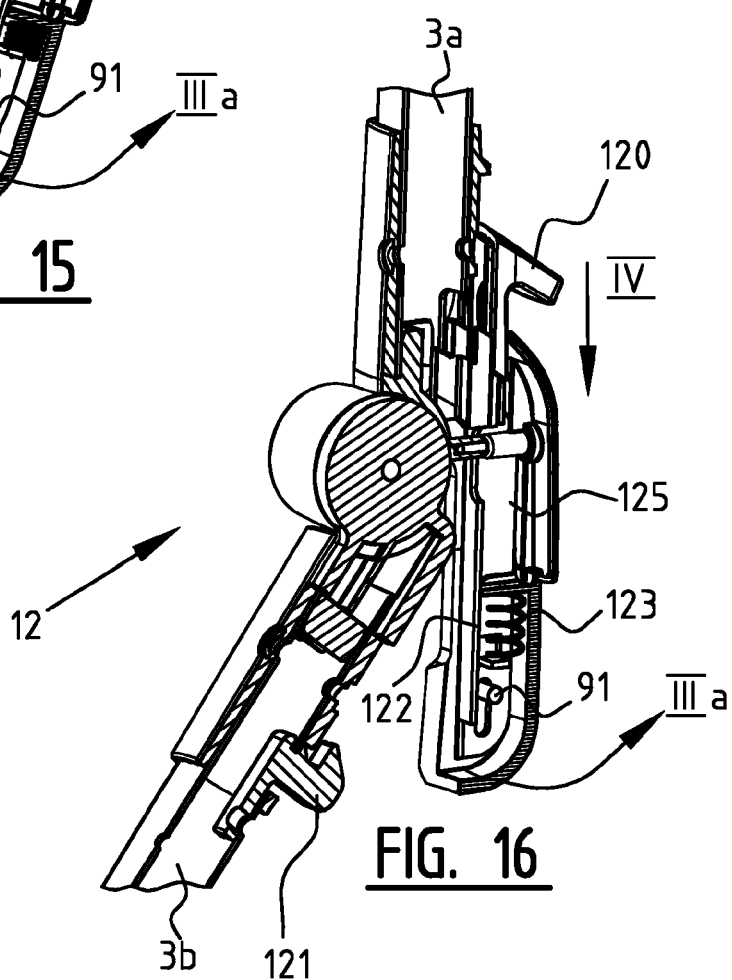

The invention will be described with reference to preferred embodiments of the stroller depicted in the drawings, wherein:

FIGS. 1-3 schematically show a preferred embodiment of the stroller from various angles;

FIGS. 4-7 schematically show the steps of folding another embodiment of the stroller according to the invention;

FIGS. 8a-c schematically show the adjustable seat;

FIGS. 9 and 10 schematically show the cross section of the frame according to the invention;

FIG. 11 schematically shows a stroller according to the invention being carried by a person;

FIGS. 12 and 13 schematically show the damping mechanics according to the invention;

FIGS. 14a-c schematically show the hinging means according to the invention in the open position, and;

FIGS. 15-16 schematically show the hinging means in subsequent steps in folding the stroller according to the invention.

In FIGS. 1-3, a stroller 1 according to the invention is shown. The stroller 1, movable between an open position wherein the stroller can be locked and a folded position, comprises front wheels 6 and rear wheels 5, a generally planar base frame 2 extending substantially between said front 6 and rear wheels 5 and two push bars 3 pivotally connected to the base frame 2 by means of a front hinge 4 substantially located near the front wheels 6, which push bars 3 extend substantially upwards and backwards in the open position. The axis of the front hinge 4 extends substantially in the plane of the base frame 2 and substantially intersects the central axes of the push bars 3.

Preferably, the distance between the axis of the front hinge 4 and the upper plane of the base frame 2 is less than half the thickness of the base frame 2, and more preferably the distance between de axis of the front hinge 4 and the central plane of the base frame 2 is less than 3 cm. Such a configuration allows a compact stroller 1 in the folded position, wherein the push bars 3 are preferably in juxtaposition with the base frame 2 in the folded position, substantially extending in the same plane.

Preferably, the outer ends of the push bars 3 are connected to a substantially horizontal push member 7, such that the front hinge 4, the push bars 3 and the push member 7 form a closed circumference.

To be able to fold the stroller 1 to the folded position, the push bars comprise an upper push bar member 3a and a lower push bar 3b member pivotally connected to the upper push bar member 3a, which allows the upper push bar member 4a to be pivoted with respect to the lower push bar member 3b and to be folded towards the front hinge 4.

The front hinge 4 is preferably arranged to form a handle, or alternatively a handle is arranged near the hinge 4 substantially in the plane of the base frame 2 to carry the stroller 1 in the folded position. Preferably, the central part of the push member 7 extends at a distance from and above the plane through both push bars 3 in the open position. And preferably the central part of the push member extends under the lower plane of the handle and the base frame in the folded position. As is also shown in FIG. 11, arranging the push member 7 in the above described way prevents the stroller 1 to unfold when carrying, since unfolding is prevented by the person's hand and/or arm.

Figure 7:
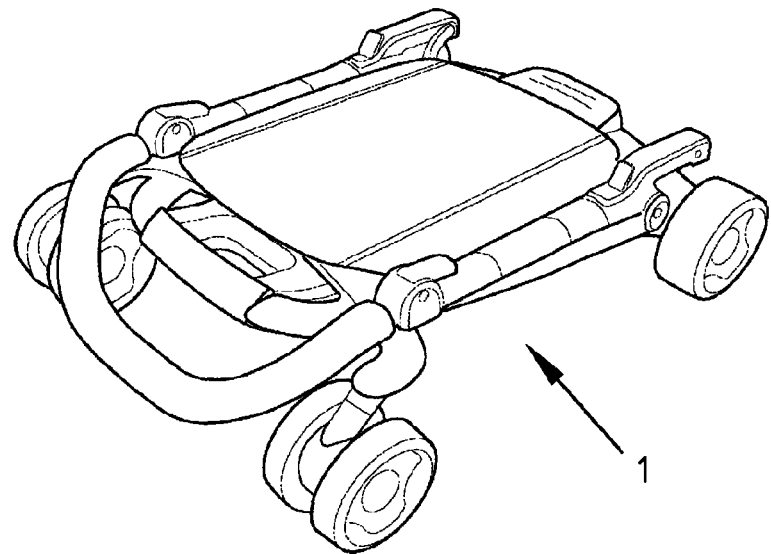

Preferably, the push bars 3 have a cross section having dimensions that are larger in lateral direction than in the direction perpendicular to the plane through both push bars 3 and more preferably, the push bars 3 comprise substantially half circular shaped cross-sectional areas, whereby the upper push bar member 3a and the lower push bar member 3b form a substantially circular cross-sectional area in the folded position, hereby allowing a compact configuration in the folded position, as is shown in the FIGS. 9, 10 and 7.

Preferably, the flattened portions of the push bars 3 member parts, more specifically the portions of the member parts abutting each other in the folded position as shown in FIG. 9, are facing upwards in the unfolded position, creating a substantially planar upper surface. It should further be noted that the larger diameter of the cross section of the push bar 3 member parts extends in a plane substantially parallel to the plane of the stroller in the folded position, resulting in substantially horizontally orientated push members in the unfolded position.

The stroller 1 further preferably comprises a support member 9 extending substantially upwardly in the open position between an intermediate location of the base frame 2 and an intermediate location of the push bars 3 and pivotally connected therewith at both ends, for example by hinging means 12. Preferably the support member 9 is substantially U-shaped and is pivotally connected at the base of the U-shape to the intermediate location of the base frame 2 and wherein the extremities of the legs of the U-shape are pivotally connected to the intermediate locations 12 on each of the push bars 3 and more preferably to the locking mechanism 125 forming an extension beyond hinge 12. Even more preferably, the base of the U-shape of the support member 9 extends beneath the base frame 2.

For comfort, the connection between the base frame 2 and the support member 9 preferably comprises damping means 10 and more preferably the damping means 10 comprises at least one rubber member 13 arranged between the support member 9 and the base frame 2, as is shown in more detail in the FIGS. 12 and 13. Even more preferably, the rubber member 13 is arranged between the support member 9 and the lower half of the base frame 2, for instance by providing a rubber tube coaxial to the lower part of the support member 9 i.e. the base of the U-shaped support member.

Preferably, the base frame 2 comprises rear wheel support members 14 extending laterally for connecting the rear wheels 5 to the base frame 2, wherein adjacent to the base frame 2 the top side of the rear wheel support members 14 are lower than the top side of the base frame 2 for accommodating the push bars 3 in juxtaposition to the base frame 2 in the folded position. More preferably, the wheel supports 14 have the shape of wings and together with the rear portion of the base frame 2 form a bent board.

The stroller 1 according to the invention further preferably comprises a detachable rolling extension board for supporting children, wherein the rear portion of the base frame 2, as indicated by 201 in FIG. 2, and/or the front portion of the extension board comprises means for attaching a rolling extension board for supporting children. More preferably, the front edge of the detachable rolling extension board for supporting children matches the rear edge 201 of the base frame 2.

Preferably, the front wheels 6 at both sides are interconnected by means of a front wheel support member 11, whereby the front wheel support member 11 is connected to the push bars 3 at both sides on locations above the hinge 4 and more preferably, the central portion of the front wheel support member 11 extends substantially above the plane of the push bars 3 for accommodating the base frame 2 between the push bars 3 in the folded position.

It is the objective of the invention to make an easy to use product which is safe for parent and child. As said, changing the configuration of the product is part of the product use. This change of the product configuration can result in a folded product, making a smaller and more compact package to carry or store.

As the design consists of more than one frame part, and the different parts of the frame can be changed in configuration and relationship to each other, the product configuration can be changed.

Figure 5:
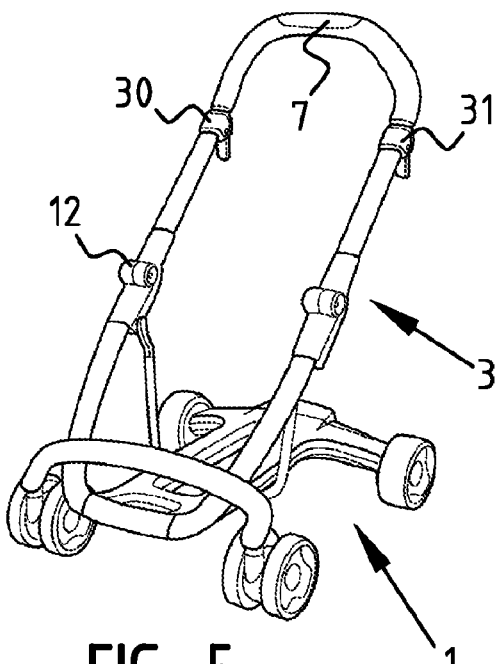
Figure 6:
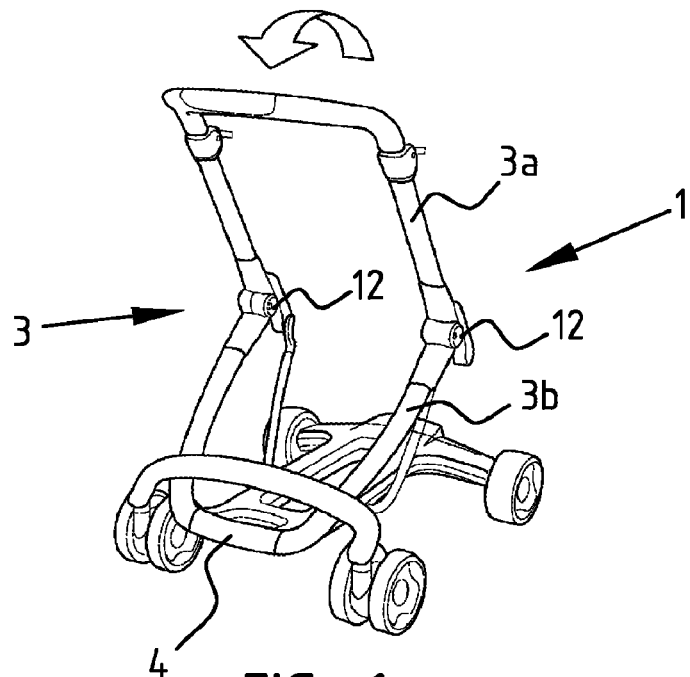

This change of configuration, or the folding of a stroller 1 according to the invention, takes place in a few steps, as shown in FIGS. 4-7. In FIG. 4, the stroller 1 is in the unfolded stage. FIG. 5 shows how the push member 7 is moved downwards after releasing the frictional locking mechanism 30 using handle 31 for creating a more compact assembly in the folded position. For unlocking the hinging means 12, a handle 107 (shown in FIGS. 14-15) is manipulated, allowing the part 3a to pivot with respect to part 3a, as will be discussed more in detail below. FIG. 6 makes clear that the upper part 3a of the frame is moved towards the lower part 3b, turning around hinges 4 and 12. FIG. 7 shows the compact folded package. Noted should be that the stroller 1 as shown in the FIGS. 4-7 is another embodiment of the stroller according to the invention than the stroller depicted in FIGS. 1-3.

In FIG. 14a the hinging means 12 according to the invention is shown. The hinging means 12 are arranged to allow pivoting of parts 3a and 3b around axis I. For activation of the locking mechanism 125 which is arranged to lock the orientation of parts 3a and 3b in the open position, hinging means 12 is provided with a handle 120.

In FIG. 14b, the hinging means 12 of FIG. 14a are schematically shown in cross section. Push member 3 part 3b is provided with a hook 121 which is arranged to engage grip member 122 of the locking mechanism 125 provided on part 3a of the push member 3. Hook 121 and grip member 122 are arranged to limit relative movement of parts 3a and 3b in the locked position of the locking mechanism 125, as shown in FIG. 14b. For directing the grip member 122 and handle 120 to the locked position, a spring 123 is provided. Unintentional manipulation of the handle 120 will therefore be corrected by spring 123, providing a reliable locking mechanism.

For unlocking the locking mechanism 125, the handle 120 is moved in direction II. By moving the handle 120, grip member 122 is moved in direction II too, and when grip member 122 is moved past the protruding part of the hook 121, as shown in FIG. 14c, upper part 3a can be pivoted in a direction III, whereby locking mechanism 125 disengages the hook 121 in a direction IIIa, as shown in FIG. 15. When the locking mechanism 125 is sufficiently far from the hook 121, handle 120 can be released, whereby handle 120 and grip member 122 are urged in a direction IV under the influence of spring 123.

Also shown in FIGS. 14-16 are the connection means 91 for connecting the U-shaped support member 9 to the locking mechanism 125. The connection means 91 extend on an extension of the push bar members 3a formed by the locking mechanism 125 on a location beyond axis I of the hinge 12.

Next to the objective to create an easy to use and safe product, another objective is to design a product that can be used over a longer lifespan and in a range of different situations. The design, comprising of a frame and seat assembly 8, achieves this with an easy to change seat assembly. The seat assembly can be taken off and replaced with a new seat assembly, different in color, insulation, recline and/or style.

The seat assembly is attached to the frame in a way that it is easy and fast to release. One could think of a quick release system to be used in this, where the seat assembly fabric is clamped between different parts or easy to release buttons on either frame or seat assembly. This is new, as in today's strollers, the seat assembly is rigidly attached to the frame, making it almost impossible to change the seat assembly.

The seat assembly is hung in the frame, and is attached to different points of the frame. The seat assembly consists of fabric or other flexible material with, when necessary, reinforcements (for example strips of strong material).

If removed from the frame, the seat assembly is easy to fold and, as a result, can be stored in a small drawer or a cabinet for example. Thus it makes it easy not only to change the seat assembly, but store it easily as well.

By introducing easy to change seat assembly's, a seat assembly with recline function can be used in the product as well. Reclining is easy to implement using different methods of changing the seat assembly configuration, for example using zippers or straps. As a result the seat assembly can be changed according to the different use situations, as is shown in FIGS. 8a-c.

The stroller 1 according to the invention, comprising a frame having two push bars 3 extending substantially upwards and backwards, preferably comprises a seat 8 attached thereto, said seat 8 substantially consisting of a flexible sheet material shaped into a bucket, wherein a back rest 17 of the sheet is provided with at least one V-shaped extension portion 15, the open side of said V-shape extending at the top side of the back rest 17, and preferably comprises connecting means 16 for joining the legs of the V-shaped portion 15 for reducing the inclination of the back rest 17. More preferably, the connecting means 16 comprise a zipper. And even more preferably, two of said V-shaped extension portions 15 are provided, one at each side of the back rest 17.

While the product consists of a frame that is not supported at the back, as regular strollers and buggy's, there is room for the recline function. The absence of a supporting frame prevents the infant being hurt.

One goal of the current invention is to create an easy to carry and store package. Current products on the market promise compact packages, however, many of the packages lack a good solution for taking the package.

The invention described solves this problem by creating a package that is small and flat, similar to a briefcase. The package has a grip incorporated, making it possible to carry the folded product similar to a bag or briefcase, as shown in FIG. 11. With the package being thin, the weight is distributed logically, in line with the grip. No gravity forces are far of the centerline of the product, preventing rotating of the product while carrying.

The low volume and uniform shape of the package allows easy storing of the product. The height of the folded product is limited, thus creating a flat package.

The invention claimed is:

1. A stroller, movable between an open position wherein the stroller can be locked and a folded position, comprising:
   front wheels and rear wheels;
   a generally planar base frame extending substantially between said front and rear wheels; and
   two push bars pivotally connected to the base frame by a front hinge substantially located near the front wheels, which push bars extend substantially upwards and backwards in the open position;
   wherein an axis of the front hinge extends substantially in a plane of the base frame and substantially intersects central axes of the push bars,
   wherein outer ends of the push bars are connected to a push member,
   wherein the central part of the push member extends under the lower plane of the handle and the base frame when the stroller is in the folded position.

2. A stroller according to claim 1, wherein the distance between the axis of the front hinge and the upper plane of the base frame is less than half the thickness of the base frame.

3. A stroller according to claim 1, wherein the distance between the axis of the front hinge and the central plane of the base frame is less than 3 cm.

4. A stroller according to claim 1, wherein the push bars are in juxtaposition with the base frame in the folded position, substantially extending in the same plane.

5. A stroller according to claim 1, wherein the front hinge, the push bars and the push member form a closed circumference.

6. A stroller according to claim 5, wherein the central part of the push member extends at a distance from and above the plane through both push bars in the open position.

7. A stroller according to claim 1, wherein the front hinge is arranged to form a handle or a handle is arranged near the front hinge substantially in the plane of the base frame to carry the stroller when the stroller is in the folded position.

8. A stroller according to claim 1, wherein the push bars comprise an upper push bar member and a lower push bar member pivotally connected to the upper-push bar member, which allows the upper push bar member to be pivoted with respect to the lower push bar-member and to be folded towards the front hinge.

9. A stroller according to claim 1, wherein the push bars have a cross section having dimensions that are larger in lateral direction than in a direction perpendicular to the plane through both push bars.

10. A stroller according to claim 8, wherein the push bars comprise substantially half circular shaped cross-sectional areas, whereby the upper push bar member and the lower push bar member form a substantially circular cross-sectional area in the folded position.

11. A stroller according to claim 8, wherein the stroller comprises a locking mechanism between the upper push bar member and the lower push bar member and locks the stroller in the open position, a support member with two ends pivotally connected to the locking mechanism and the base frame respectively.

12. A stroller according claim 1, wherein the stroller further comprises a support member extending substantially upwardly in the open position between an intermediate location of the base frame and an intermediate location of the push bars and pivotally connected therewith at both ends.

13. A stroller according to claim 12, wherein the support member is substantially U-shaped and includes a base and two legs connected to two ends of the base, wherein the base of the U-shape is pivotally connected to the base frame and the extremities of the respective legs of the U-shape are pivotally connected to the push bars.

14. A stroller according to claim 13, wherein the base of the U-shape of the support member extends beneath the base frame.

15. A stroller according to claim 12, wherein the connection between the base frame and the support member comprises damping means.

16. A stroller according to claim 15, wherein the damping means comprises at least one rubber member arranged between the support member and the base frame.

17. A stroller according to claim 16, wherein the rubber member is arranged between the support member and the lower half of the base frame.

18. A stroller according to claim 1, wherein the base frame comprises rear wheel support members extending laterally for connecting the rear wheels to the base frame, wherein adjacent to the base frame the top side of the rear wheel support members are lower than the top side of the base frame for accommodating the push bars in juxtaposition to the base frame in the folded position.

19. A stroller according to claim 18, wherein the wheel support members have the shape of wings and together with the rear portion of the base frame form a bent board.

20. A stroller, movable between an open position wherein the stroller can be locked and a folded position, comprising:
   front wheels and rear wheels;
   a generally planar base frame extending substantially between said front and rear wheels; and
   two push bars pivotally connected to the base frame by a front hinge substantially located near the front wheels, which push bars extend substantially upwards and backwards in the open position;
   wherein an axis of the front hinge extends substantially in a plane of the base frame and substantially intersects central axes of the push bars, and
   wherein the front wheels at both sides are interconnected by a front wheel support member, whereby the front wheel support member is connected to the push bars at both sides on locations above the front hinge.

21. A stroller according to claim 20, wherein the central portion of the front wheel support member extends substantially above the plane of the push bars for accommodating the base frame between the push bars in the folded position.

22. A stroller, movable between an open position wherein the stroller can be locked and a folded position, comprising:
   front wheels and rear wheels;
   a generally planar base frame extending substantially between said front and rear wheels;
   two push bars pivotally connected to the base frame by a front hinge substantially located near the front wheels, which push bars extend substantially upwards and backwards in the open position,
   wherein an axis of the front hinge extends substantially in a plane of the base frame and substantially intersects a central axis of each push bar; and
   a support member extending substantially upwardly in the open position between an intermediate location of the base frame and an intermediate location of the push bars and pivotally connected therewith at both ends,
   wherein the support member is substantially U-shaped and includes a base and two legs connected to two ends of the base, wherein the base of the U-shape is pivotally connected to the base frame and the extremities of the respective legs of the U-shape are pivotally connected to the push bars.

23. A stroller according to claim 22, wherein the base of the U-shape of the support member extends beneath the base frame.

24. A stroller according to claim 22, wherein the connection between the base frame and the support member comprises damping means.

* * * * *